United States Patent Office 3,317,600
Patented May 2, 1967

3,317,600
1-(PROPARGYLOXYPHENYL)-3,3-DIMETHYL UREAS
Peter John Brooker, Saffron Walden, Essex, John Gillon, Cambridge, and Geoffrey Tattersall Newbold, Saffron Walden, Essex, England, assignors to Fisons Pest Control Limited, Cambridgeshire, England
No Drawing. Filed Jan. 4, 1965, Ser. No. 423,383
Claims priority, application Great Britain, Jan. 11, 1964, 1,336/64
2 Claims. (Cl. 260—553)

The present invention relates to improved chemical compounds which have been found to possess herbicidal activity and to their use as herbicides.

It has been found that 1-(p-propargyloxyphenyl)-3,3-dimethyl urea and 1-(m-propargyloxyphenyl)-3,3-dimethyl urea are surprisingly active herbicides.

The new compounds can be employed in herbicidal composition which can also contain a solid diluent, wetting agent or organic solvent.

The new compounds can also be used for the control of weeds by applying to the weeds or to the soil a herbicidal composition as described above.

The 1-(p-propargyloxyphenyl)-3,3-dimethyl urea and 1-(m-propargyloxyphenyl)-3,3-dimethyl urea are prepared by one of the following methods:

(a) the reaction of meta- or para-(propargyloxy) aniline with dimethylcarbamoyl chloride in an inert solvent in the presence of a proton acceptor;
(b) the reaction of meta- or para-(propargyloxy)phenyl isocyanate with dimethylamine in an anhydrous solvent;
(c) the reaction of a meta- or para-substituted phenyl-3,3-dimethyl urea with a sulphonic ester of propargyl alcohol.

The substituent groups are suitably hydroxy; the sulphonic ester is suitably a benzene sulphonate.

The herbicidal activity of the compounds according to the present invention is of a general character, and the compounds may be used for total weed killing purposes. If desired the compounds according to the present invention may be used in admixture with one or more other herbicides such as sodium chlorate, 2-methyl-4-chlorophenoxyacetic acid, 2,4-dichlorophenoxyacetic acid, 2,4,5-trichlorophenoxyacetic acid, alpha,alpha-dichloropropionic acid, 2,3,6-trichlorobenzoic acid, 2-methoxy-3,6-dichlorobenzoic acid, 2-methoxy-3,5,6-trichlorobenzoic acid, N-p-chlorophenyl - N',N' - dimethylurea, 2-chloro-4,6-bis (monoethylamino)-s-triazine and 2-chloro-4-monoethylamino-6-monopropylamine-s-triazine. In some cases improved results are obtained with such mixtures.

In herbicidal compositions the compounds according to the invention may be incorporated for example with solid inert media comprising powdered or divided solid materials, for example clays such as china clay, sands, talc, mica and the like; such products either comprising dust or larger particle size materials.

It is preferred however to mix the compounds according to the invention with a wetting agent, with or without the incorporation of powdered or divided solid materials as referred to above, so that a wettable product is obtained which is capable of use as such or as a suspension or dispersion in water.

If desired the compounds according to the invention may be incorporated with an organic solvent together with a wetting or dispersing agent so as to form an emulsifiable liquid concentrate which may be dispersed in water for spraying purposes.

The wetting agents used may comprise anionic compounds such as for example soaps, fatty sulphate esters such as dodecyl sodium sulphate, fatty aromatic sulphonates such as alkylbenzene-sulphonates or butyl naphthalene sulphates, more complex fatty sulphonates such as the amide condensation product of oleic acid and N-methyl taurine or the sodium salt of dioctyl sulphosuccinic acid. The wetting agents may also comprise non-ionic wetting agents such as for example condensation products of fatty acids, fatty alcohols or fatty substituted phenols with ethylene oxide, or fatty esters and ethers of sugars or polyhydric alcohols, or the products obtained from the latter by condensation with ethylene oxide, or the products known as block copolymers of ethylene oxide and propylene oxide. The wetting agents may also comprise cationic agents such as for example cetyl trimethylammonium bromide and the like.

The following examples are given to illustrate the present invention. The parts and percentages quoted are by weight.

*Example 1*

A solution of 12.5 parts of p-propargyloxyaniline, 8.1 parts of triethylamine and 8.6 parts of dimethylcarbamoyl chloride, in 50 parts of ether, was allowed to stand at room temperature for several days. The precipitate was collected, washed with water and recrystallized from ethanol to give 1-(p-propargyloxyphenyl)-3,3-dimethyl urea as an off-white powder, melting point 104–108° C.

Analysis.—Found: C, 66.05; H, 6.75; N, 12.45; O, 14.85%. $C_{12}H_{14}N_2O_2$ requires: C, 66.03; H, 6.47; N, 12.84; O, 14.66%.

*Example 2*

By the reaction of 99 parts of p-propargyloxyaniline and 150 parts of phosgene in 270 parts of ethylacetate according to Organic Synthesis C, volume II, page 453, there was obtained 103.5 parts (89%) of p-propargyloxyphenyl isocyanate, boiling point 116–123° C./9.5 mm., melting point 40–42° C.

48.5 parts of this isocyanate in 100 parts dry ether were added dropwise to a stirred solution of 13.5 parts anhydrous dimethylamine in 150 parts of ether with cooling. After two hours the product was collected and washed with ether and dried, giving 50.5 parts of 1-(p-propargyloxyphenyl)-3,3-dimethyl, urea, melting point 104–107° C.

*Example 3*

To a solution of 30 parts of p-aminophenol in 600 parts of dry acetone were added 28 parts of sodium bicarbonate and 30 parts of dimethylcarbamoyl chloride. The mixture was stirred and boiled under reflux for three hours. The solid was filtered off and the filtrate was evaporated under reduced pressure to give a cream solid which was recrystallised from a mixture of ethanol and 60°/80° petroleum ether, giving 30 parts of 1-(p-hydroxyphenyl)-3,3-dimethyl urea, melting point 205–206° C.

Analysis. — Found: C, 60.10; H, 6.90; N, 15.40%. $C_9H_{12}N_2O_2$ requires: C, 59.98; H, 6.71; N, 15.55%.

To a solution of 13.6 parts of 1-(p-hydroxyphenyl)-3,3-dimethyl urea and 3.2 parts of sodium hydroxide in 50 parts of water were added 14.8 parts of propargyl benzenesulphonate. The mixture was stirred vigorously at 45° C. for two hours. On cooling 10 parts of 1-(p-propargyloxyphenyl)-3,3-dimethyl urea were obtained.

*Example 4*

The process of Example 3 was repeated using m-aminophenol in place of p-aminophenol, giving 1-(m-propargyloxyphenyl)-3,3-dimethyl urea, melting point 118–119° C.

*Example 5*

Finely ground powders were made up to the following compositions:

I

| | Percent |
|---|---|
| 1-(m-propargyloxyphenyl)-3,3-dimethyl urea | 25 |
| Kaolin | 70 |
| Sodium salt of sulphated alkyl phenol ethylene oxide condensation product known as Hoe S 2/154 | 2 |
| Sodium salt of sulphonated cresol urea formaldehyde condensation product known as Dyapol PT | 3 |

II

| | |
|---|---|
| 1-(p-propargyloxyphenyl)-3,3-dimethyl urea | 25 |
| Kaolin | 70 |
| Sodium salt of sulphated alkyl phenol ethylene oxide condensation product known as Hoe S 2/154 | 2 |
| Sodium salt of sulphonated cresol urea formaldehyde condensation product known as Dyapol PT | 3 |

In one experiment suspensions of each powder in water containing 1.0% and 0.5% of the substituted urea were sprayed at the rate of 50 gallons per acre on the following plants at the 2–3 true leaf stage.

Pea—(*Pisum sativum*)
Mustard—(*Brassica alba*)
Linseed—(*Linum usitatissimum*)
Buckwheat—(*Fagopyrum exulentum*)
Sugarbeet—(*Beta vulgaris*)
Barley—(*Hordeum vulgare*).

All plants showed severe scorch after three days, barley being least scorched. After one week all plants were dead at the higher dosage except barley, growth of which was much less than in controls, and peas, severely stunted and 50% dead. At the lower dosage all buckwheat was dead and a high mortality and severe stunting of survivors among all species except barley.

In another experiment the powders were mixed into potting compost in each case at rates to give 50, 10 and 5 pounds of the substituted urea per acre when the compost was placed in seed pans to a depth of 2½ inches.

Seeds of the following species were sown in these boxes:

Pea—(*Pisum sativum*)
Mustard—(*Brassica alba*)
Linseed—(*Linum usitatissimum*)
Maize—(*Zea mays*)
Barley—(Hordeum)
Ryegrass—(*Lolium multiflorum*).

Percentage emergence of seedlings in treated pans was very little less than in controls, but later became pale, flaccid and necrotic when assessed three weeks after sowing.

*Example 6*

Compositions were made up as follows:

(a)

| | Percent |
|---|---|
| 1-(p-propargyloxyphenyl)3,3-dimethyl urea | 12.5 |
| Dodecyl benzene sulphonic acid known as Cycloryl ABSA | 28 |
| Petroleum naphtha | 62.5 |

(b)

| | |
|---|---|
| 1-(p-propargyloxyphenyl)-3,3-dimethyl urea | 5 |
| Tri-tertiary butyl phenol polyether alcohol known as Sapogenat T-110 | 95 |

These formulations were diluted with water to give 0.25% concentration of the substituted urea. Composition (a) formed a stable emulsion and Composition (b) a clear solution. A wettable powder as in Example 5 containing 0.25% of 1-(m-propargyloxyphenyl)-3,3-dimethyl urea was also made up (Composition (c)). These compositions were sprayed at the rate of 40 gallons per acre (that is 1 pound active compound per acre) on seedlings as in Example 5. The effects on the plants at the end of 10 days are recorded in the table below as percent reduction in weight compared with control plants. Composition (d) is the same as Composition (b) but without the substituted urea (that is wetting agent only).

| Species | Composition | | | |
|---|---|---|---|---|
| | (a) | (b) | (c) | (d) |
| Pea (*Pisum sativum*) | 100 | 100 | 45 | 65 |
| Mustard (*Brassica alba*) | 81 | 100 | 98 | 61 |
| Linseed (*Linum usitatissimum*) | 64 | 81 | 28 | 51 |
| Buckwheat | 100 | 100 | 100 | 48 |
| Sugar beet | 100 | 100 | 100 | 88 |
| Barley (Hordeum) | 52 | 63 | 0 | 18 |
| Wheat (*Triticum vulgare*) | 58 | 78 | 47 | 34 |
| Wild oat (*Avena fatua*) | 70 | 86 | 53 | 43 |
| Cotton (*Gossypium hirsutum*) | 60 | 61 | 25 | 32 |
| Maize (*Zea mays*) | 62 | 50 | 0 | 40 |
| Blackgrass (*Alopecuris myosuroides*) | 95 | 97 | 82 | 65 |
| Chickweed (*Stellaria media*) | 100 | 100 | 94 | 74 |

It is evident that extensive damage results from the very high concentration of wetting agent only, but the damage is always greater in the presence of the substituted urea and even in the case of barley and maize, which are not reduced in growth by the compound with minimum wetting agent, (Composition (c)), damage greater than that produced by the wetting agent only is produced when the substituted urea is present.

We claim:
1. 1-(para-propargyloxyphenyl)-3,3-dimethyl urea.
2. 1-(meta-propargyloxyphenyl)-3,3-dimethyl urea.

References Cited by the Examiner

UNITED STATES PATENTS

| 2,254,136 | 8/1941 | Buck et al. | 260—553 |
| 2,651,620 | 9/1953 | Hill et al. | 260—553 |
| 2,780,535 | 2/1957 | Snyder | 260—553 |

OTHER REFERENCES

Brewster: Organic Chemistry (Prentice-Hill, 1948) (pages 128 and 596).

ALEX MAZEL, *Primary Examiner.*

HENRY R. JILES, *Examiner.*